United States Patent [19]
Abe et al.

[11] Patent Number: 5,365,440
[45] Date of Patent: Nov. 15, 1994

[54] FOUR WHEEL STEERING SYSTEM

[75] Inventors: Masaru Abe; Yoshimichi Kawamoto; Ikuo Nonaga; Masataka Izawa, all of Tochigi, Japan

[73] Assignee: Honda Giken Kogyo Kabushiki Kaisha, Tokyo, Japan

[21] Appl. No.: 800,070

[22] Filed: Nov. 27, 1991

[30] Foreign Application Priority Data

Nov. 30, 1990 [JP] Japan .................................. 2-336801

[51] Int. Cl.$^5$ ............................................. B62D 6/00
[52] U.S. Cl. ................................ 364/424.05; 280/91; 180/140; 180/141; 180/142
[58] Field of Search ....................... 364/424.05; 280/91; 180/140–144

[56] References Cited

U.S. PATENT DOCUMENTS

| | | | |
|---|---|---|---|
| 4,666,013 | 5/1987 | Shibahata et al. | 180/141 |
| 4,770,265 | 9/1988 | Allen | 180/140 |
| 5,020,619 | 6/1991 | Kanazawa et al. | 180/140 |

FOREIGN PATENT DOCUMENTS

0199347 10/1986 European Pat. Off. .
112714 1/1989 Japan .

*Primary Examiner*—Thomas G. Black
*Assistant Examiner*—Leigh Marie Garbowski
*Attorney, Agent, or Firm*—Irving M. Weiner; Joseph P. Carrier; Pamela S. Burt

[57] ABSTRACT

A four wheel steering system for a motor vehicle with steerable front and rear road wheels, a steering angle sensor for detecting a front wheel steering angle through which the front road wheels are steered, a vehicle speed sensor for detecting a vehicle speed of the motor vehicle, a rear wheel steering mechanism for steering the rear wheels, and a controller for controlling the rear wheel steering mechanism to steer the rear road wheels based on the detected front wheel steering angle and the detected vehicle speed when the front road wheels are steering. The controller controls the rear wheel steering mechanism to steer the rear road wheels in a direction which is opposite to the front road wheels if the detected vehicle speed is relatively low, and also controls the rear wheel steering mechanism to steer the rear road wheels in a direction which is the same as the front road wheels if the detected vehicle speed is relatively high. Furthermore, the controller controls the rear wheel steering mechanism to increase a rear wheel steering angle which through the rear road wheels are steered as the front wheel steering angle increases if a change in the front wheel steering angle is relatively small, and controls the rear wheel steering mechanism to reduce an increase in the rear wheel steering angle if a change in the front wheel steering angle is relatively large.

13 Claims, 4 Drawing Sheets

FIG. 5 — DATA TABLE 3
FIG. 7 — DATA TABLE 4
FIG. 3 — DATA TABLE 1
FIG. 4 — DATA TABLE 2

FIG. 6

FOUR WHEEL STEERING SYSTEM

BACKGROUND OF THE INVENTION

1. Field of the Invention

The present invention relates to a four wheel steering system for motor vehicles, and more particularly to a four wheel steering system for steering rear road wheels of a motor vehicle depending on a change in the steering angle of front road wheels of the motor vehicle.

2. Description of the Prior Art

One conventional four wheel steering system for motor vehicles is shown in Japanese Patent Publication No. 1-12714, for example. The disclosed four wheel steering system steers the rear road wheels in the opposite direction to the front road wheels when the driver's steering action is quick, and steers the rear road wheels in the same direction as the front road wheels when the driver's steering action is slow.

However, the conventional four wheel steering system is disadvantageous in that if the driver attempts to quickly steer the motor vehicle when the rear road wheels have already been steered in the opposite direction to the front road wheels by a quick steering action, then the rear road wheels are steered through a large steering angle, adversely affecting the behavior of the motor vehicle.

SUMMARY OF THE INVENTION

In view of the aforesaid problem of the prior four wheel steering system, it is an object of the present invention to provide a four wheel steering system which allows a motor vehicle to be steered with stable behaviors at all times irrespective of whether the driver's action to steer the front wheels is quick or slow.

According to the present invention, there is provided a four wheel steering system for a motor vehicle with steerable front and rear road wheels, comprising means for detecting a front wheel steering angle through which the front road wheels are steered, means for detecting a vehicle speed of the motor vehicle, a mechanism for steering the rear wheels, and control means for controlling the mechanism to steer the rear road wheels based on the detected front wheel steering angle and the detected vehicle speed when the front road wheels are steered, the control means comprising means for controlling the mechanism to steer the rear road wheels in a direction which is opposite to the front road wheels if the detected vehicle speed is relatively low, controlling the mechanism to steer the rear road wheels in a direction which is the same as the front road wheels if the detected vehicle speed is relatively high, controlling the mechanism to increase a rear wheel steering angle through which the rear road wheels are steered as the front wheel steering angle increases if a change in the front wheel steering angle is relatively small, and controlling the mechanism to reduce an increase in the rear wheel steering angle if a change in the front wheel steering angle is relatively large.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
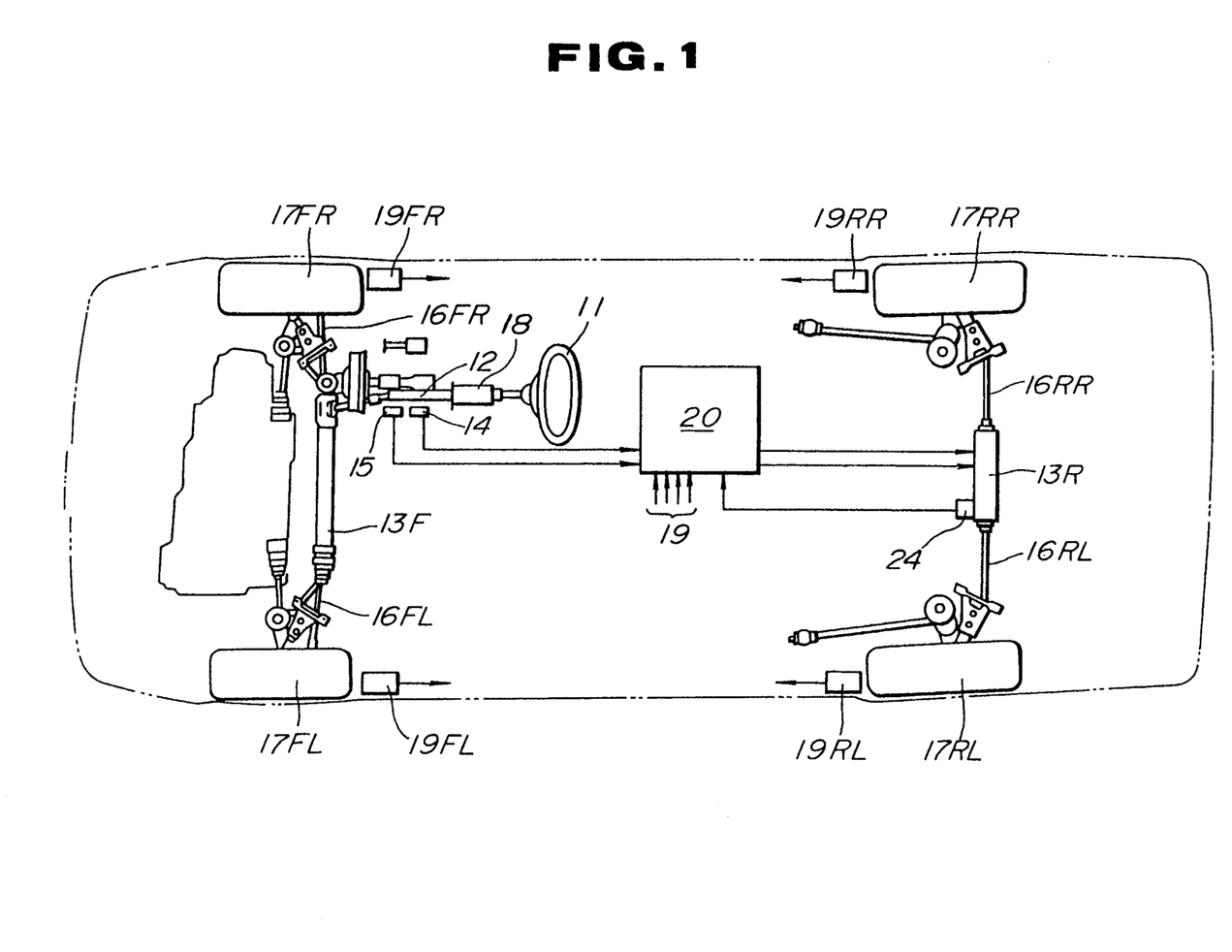
FIG. 1 is a schematic plan view of a four wheel steering system, as incorporated in a motor vehicle, according to the present invention.

FIG. 1 schematically shows a four wheel steering system, as incorporated in a motor vehicle, according to the present invention.

As shown in FIG. 1, the motor vehicle has a steering wheel 11 operatively coupled through a steering shaft 12 to a rack-and-pinion front wheel steering gear mechanism in a front gear housing 13F mounted on a front portion of the body of the motor vehicle. The steering shaft 12 is rotatably disposed in a column 18 that is associated with a steering angle sensor 14 and a steering speed sensor 15. The steering angle sensor 14 comprises an encoder or the like for detecting the angle through which the steering shaft 12 rotates about its own axis. The steering speed sensor 15 comprises a tachometer generator or the like for detecting the angular velocity at which the steering shaft 12 rotates about its own axis. The sensors 14, 15 send detected signals to a controller 20 electrically connected thereto.

The steering gear mechanism comprises a pinion (not shown) rotatable with the steering shaft 12 and a rack (not shown) extending transversely of the motor vehicle. The rack has opposite ends coupled respectively to left and right front road wheels 17FL, 17FR through respective steering linkages such as tie rods 16FL, 16FR, for transmitting a driver's steering action from the steering wheel 11 to the front road wheels 17FL, 17FR. The front road wheels 17FL, 17FR and rear road wheels 17RL, 17RR are associated with respective vehicle speed sensors 19FL, 19FR, 19RL, 19RR (which will also be generally referred to as speed sensors 19). These speed sensors 19 are electrically connected to the controller 20. Instead of the sensors 14, 15, there may be employed sensors for detecting a steering angle and a steering angular velocity of the front road wheels 17FL, 17FR directly from the front road wheels 17FL, 17FR.

A rear gear housing 13R is mounted on a rear portion of the motor vehicle body, and houses a rear wheel steering mechanism (not shown). The rear wheel steering mechanism comprises a rod slidably supported in the housing 13R and extending transversely of the motor vehicle, an electric motor for axially moving the rod, and a rear wheel steering angle sensor 24 for detecting the axial displacement of the rod. The rod of the rear wheel steering mechanism has opposite ends connected respectively to the rear road wheels 17RL, 17RR through respective tie rods 16RL, 16RR. The electric motor and the rear wheel steering angle sensor 24 are electrically connected to the controller 20. The electric motor is energized by the controller 20 to steer the rear road wheels 17RL, 17RR. When the rod of the rear wheel steering mechanism is axially displaced, the rear wheel steering angle sensor 24 detects the corresponding steering angle of the rear road wheels 17RL, 17RR, and applies a detected signal to the controller 20.

The controller 20 comprises a microcomputer connected to the sensors 14, 15, 19, 24 and a motor driver (not shown) connected to the electric motor of the rear wheel steering mechanism 13R. The microcomputer processes output signals from the sensors 14, 15, 19, 24 to determine a target steering angle and a target steering angular velocity for the rear road wheels 17RL, 17RR, determines a direction in which an electric current is to be supplied to the electric motor and a duty factor with which the electric motor is to be energized, and outputs a PWM signal indicative of the determined direction and duty factor to the motor driver. The motor driver comprises a bridge of FETs or the like for energizing the electric motor based on the PWM signal from the microcomputer.

Operation of the four wheel steering system shown in FIG. 1 will be described below with reference to FIG. 2.

Figure 2:
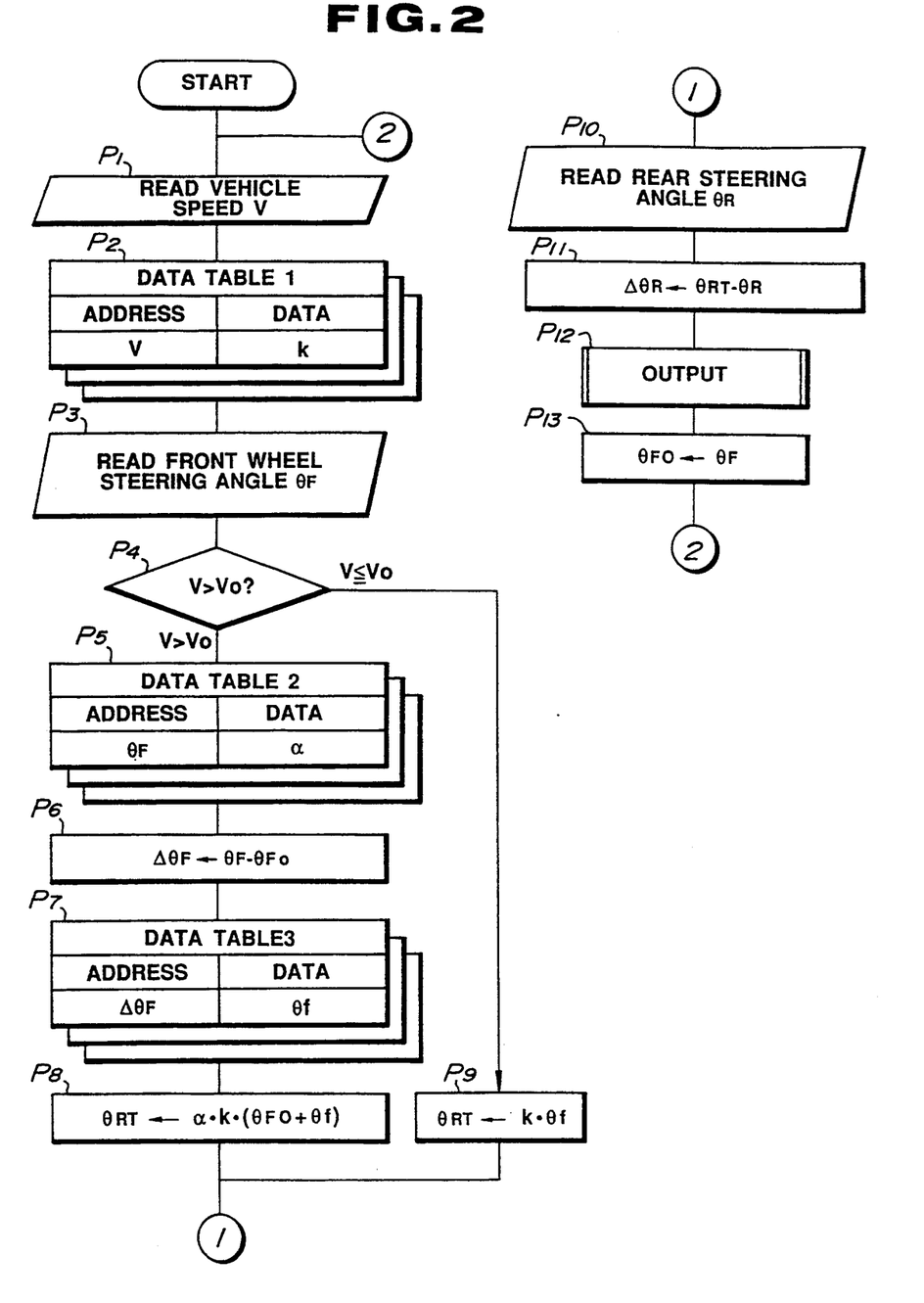
FIG. 2 is a flowchart of a control process according to a first embodiment of the present invention, which is to be executed by a controller in the four wheel steering system.

The microcomputer of the controller 20 executes the control process shown in FIG. 2 to control the electric motor in the rear gear housing 13R, i.e., to control the steering operation of the rear road wheels 17RL, 17RR.

Figure 3:
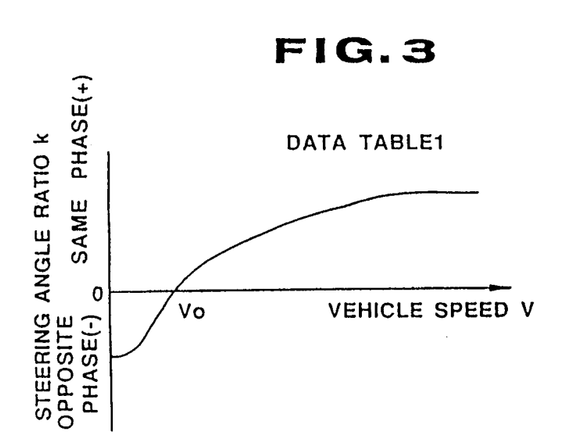
FIG. 3 is a data table 1 of vehicle speeds V and steering angle ratios k, used in the control process shown in FIG. 2.

First, when the driver of the motor vehicle turns the ignition key to shift the key switch to the ON position, the controller 20 is energized by the battery of the motor vehicle, starting to operate the microcomputer. The microcomputer reads a vehicle speed V from the output signals of the vehicle speed sensors 19 in a step $P_1$. Then, in a step $P_2$, the microcomputer looks for a steering angle ratio k addressed by the vehicle speed V in a data table 1 shown in FIG. 3 that is stored in a ROM of the microcomputer. The steering angle ratio is a ratio between the steering angle of the front road wheels and the steering angle of the rear road wheels. The data table 1 contains reference steering angle ratios k with respect to corresponding vehicle speeds. As shown in FIG. 3, the steering angle ratio k is zero at a predetermined vehicle speed $V_0$, negative in a vehicle speed range lower than the vehicle speed $V_0 (V<V_0)$, and positive in a vehicle speed range higher than the vehicle speed $V_0 (V>V_0)$. The positive steering angle ratios k indicate that the front and rear road wheels are in the same phase, meaning that the front and rear road wheels are steered in the same direction, and the negative steering angle ratios k indicate the front and rear road wheels are in the opposite phase, meaning that the front and rear road wheels are steered in the opposite directions.

Then, the microcomputer reads a front wheel steering angle $\theta_F$ from the output signal of the steering angle sensor 14 in a step $P_3$. The microcomputer determines whether the vehicle speed V read in the step $P_1$ exceeds the predetermined vehicle speed $V_0$ or not in a step $P_4$. Since the predetermined vehicle speed $V_0$ is the same as the vehicle speed $V_0$ used in the step $P_2$, the step $P_4$ is equivalent to determining whether the steering angle ratio is positive or negative, i.e., whether the front and rear road wheels are in the same phase or in the opposite phase. If the vehicle speed V is equal to or lower than the predetermined vehicle speed $V_0$, then the microcomputer multiplies the front wheel steering angle $\theta_F$ by the steering angle ratio k, producing a target rear wheel steering angle $\theta_{RT}$ in a step $P_9$.

Figure 4:
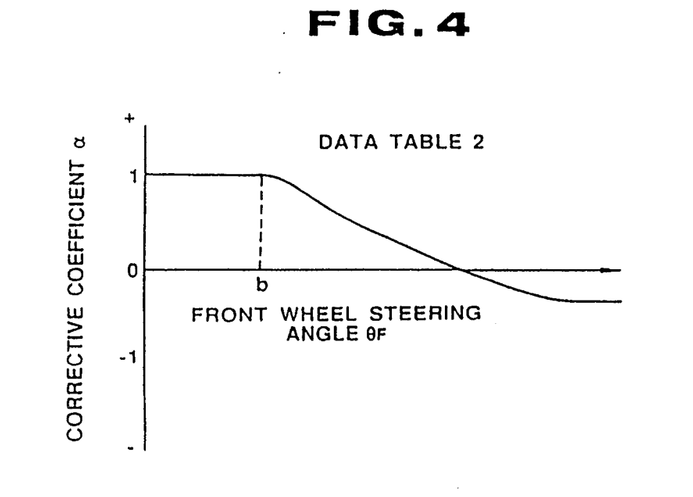
FIG. 4 is a data table 2 of front wheel steering angles $\theta_F$ and corrective coefficients $\alpha$, used in the control process shown in FIG. 2.

If the vehicle speed V is higher than the predetermined vehicle speed $V_0$, then control goes from the step $P_4$ to a step $P_5$ in which the microcomputer searches the data table 2 for a corrective coefficient $\alpha$ addressed by the front wheel steering angle $\theta_F$. As shown in FIG. 4, the corrective coefficient $\alpha$ is of a constant value of 1 if the front wheel steering angle $\theta_F$ is smaller than a predetermined front wheel steering angle b, and is progressively reduced if the front wheel steering angle $\theta_F$ goes larger than the predetermined front wheel steering angle b. This means that the motor vehicle can be steered for easy smaller turns when the front wheel steering angle $\theta_F$ is relatively large while the front and rear road wheels are in the same phase.

Figure 5:
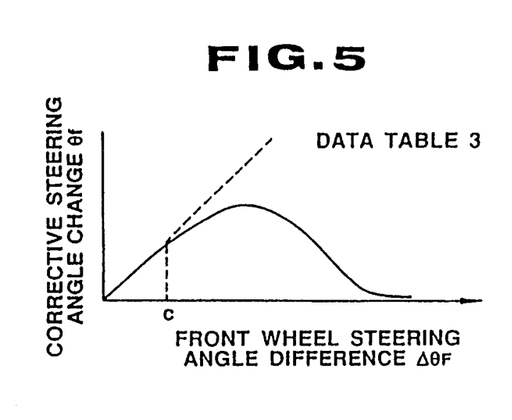
FIG. 5 is a data table 3 of front wheel steering angle differences $\Delta\theta_F$ and corrective steering angle changes $\theta_{fi}$ used in the control process shown in FIG. 2.

In a next step $P_6$, the microcomputer subtracts a previous front wheel steering angle $\theta_{F0}$ read in a previous routine of the control process from the front wheel steering angle $\theta_F$ read in the step $P_3$ of the present routine of the control process, thus producing a front wheel steering angle difference $\Delta\theta_F$. The front wheel steering angle difference $\Delta\theta_F$ may be regarded as being equivalent to a front wheel steering angular velocity $\theta_F$ since the control process is carried out at predetermined cyclic periods. Then, in a step $P_7$, the microcomputer determines a corrective steering angle change $\theta_f$ addressed by the front wheel steering angle difference $\Delta\theta_F$ from a data table 3 shown in FIG. 5. In FIG. 5, if the front wheel steering angle difference $\Delta\theta_F$ is smaller than a predetermined value c, then the corrective steering angle change $\theta_f$ is of a positive value and given as a linear function of the front wheel steering angle difference $\Delta\theta_F$. If the front wheel steering angle difference $\Delta\theta_F$ is larger than the predetermined value c, then the corrective steering angle change $\theta_f$ is of a positive value and given as a parabolic function, which is upwardly convex, of the front wheel steering angle difference $\Delta\theta_F$. Therefore, the corrective steering angle change $\theta_f$ becomes progressively smaller as the front wheel steering angle difference $\Delta\theta_F$ is increased in a relatively large range thereof. In a step $P_8$, the microprocessor multiplies the sum of the previous front wheel steering angle $\theta_{F0}$ and the corrective steering angle change $\theta_f$ by the corrective coefficient $\alpha$ and the steering angle ratio k, thus determining a target rear wheel steering angle $\theta_{RT}$. If the corrective steering angle change $\theta_f$ is small, then the difference between the target rear wheel steering angle $\theta_{RT}$ thus determined and the target rear wheel steering angle $\theta_{RT}$ in the previous routine is small. For example, since the corrective steering angle change $\theta_f$ is small when the front wheel steering angle difference $\Delta\theta_F$ is large, the difference between the target rear wheel steering angle $\theta_{RT}$ thus determined and the target rear wheel steering angle $\theta_{RT}$ in the previous routine may be smaller than it is when the front wheel steering angle difference $\Delta\theta_F$ is small.

More specifically, the target rear wheel steering angle $\theta_{RT}$ is expressed by:

$$\theta_{RT} = k \times \alpha \times (\theta_{f0} + \theta_f) \tag{1}$$

If the front wheel steering angle difference $\Delta\theta_F$ is smaller than the value c, then the corrective steering angle change $\theta_f$ is given as:

$$\theta_f = \theta_F - \theta_{F0} \qquad (2)$$

(assuming that the linear portion of the corrective steering angle change $\theta_f$ below the value c has a proportional coefficient of 1), and the equation (1) becomes:

$$\theta_{RT} = k \times a \times \theta_F \qquad (1)'$$

The equation (1)' is a function which is not related to the previous front wheel steering angle $\theta_{F0}$ and is not affected by the steering angle change. Therefore, when the steering action is slow, the target rear wheel steering angle $\theta_{RT}$ is determined by the vehicle speed and the steering angle at the time.

When the steering speed is increased and the front wheel steering angle difference $\Delta\theta_F$ exceeds the value c, the corrective steering angle change $\theta_f$ becomes smaller than the front wheel steering angle difference $\Delta\theta_F$, which is used as the value of $\theta_f$ for determining the target rear wheel steering angle $\theta_{RT}$ as expressed by the equation (1)' because the corrective steering angle change $\theta_f$ is represented by an upwardly convex curve and is smaller than the proportional function indicated by the dotted line in FIG. 5. As the front wheel steering angle difference $\Delta\theta_F$ is larger, since $\theta_f \approx 0$, the equation (1) becomes:

$$\theta_{RT} \approx k \times a \times \theta_{F0} \qquad (1)''$$

When the steering action is quick, the increase in the front wheel steering angle difference $\Delta\theta_F$ is reduced. However, insofar as the vehicle speed is constant, the target rear wheel steering angle $\theta_{RT}$ does not become smaller than the rear wheel steering angle which has been achieved according to the previous front wheel steering angle $\theta_{F0}$ when the front and rear road wheels are steered in the same phase, no matter how quick the steering action may be, provided the front wheel steering angle is in a range below the value b as when the motor vehicle runs at high speed. Even when the front wheel steering angle is greater than the value b, any reduction in the rear wheel steering angle due to the corrective coefficient a when the front and rear road wheels are steered in the same phase is held to a minimum.

In a next step $P_{10}$, the microcomputer reads a rear wheel steering angle $\theta_R$ from the output signal of the rear wheel steering angle sensor 24. Then, the microcomputer calculates the difference $\Delta\theta_R$ between the target rear wheel steering angle $\theta_{RT}$ and the read rear wheel steering angle $\theta_R$ in a step $P_{11}$. In a step $P_{12}$, the microcomputer controls the motor driver to energize the electric motor in the gear housing 13R for thereby turning or steering the rear road wheels 17RL, 17RR to the target rear wheel steering angle $\theta_{RT}$. Then, the microcomputer stores the front wheel steering angle $\theta_F$ in preparation for a next routine in a step $P_{13}$. Then, the microcomputer repeats the control process from the step $P_1$ all over again.

With the four wheel steering system according to the above embodiment, as described above, the target rear wheel steering angle $\theta_{RT}$ is corrected depending on the front wheel steering angle difference $\Delta\theta_F$ between the front wheel steering angle $\theta_{F0}$ in the previous routine and the front wheel steering angle $\theta_F$ in the present routine, i.e., depending on the steering speed, such that the change in the target rear wheel steering angle $\theta_{RT}$, which tends to increase when the front wheel steering angle difference $\Delta\theta_F$ is larger, is reduced. Therefore, even when a quick steering action is additionally effected from the condition in which the rear road wheels 17RL, 17RR have been steered in the same phase as the front road wheels 17FL, 17FR, the direction in which the rear road wheels 17RL, 17RR are steered does not vary, and the change in the steering angle of the rear road wheels 17RL, 17RR is reduced. Consequently, the four wheel steering system keeps the motor vehicle highly stable while increasing a yaw response which is a response of the motor vehicle to the steering action in making a turn.

Figure 6:
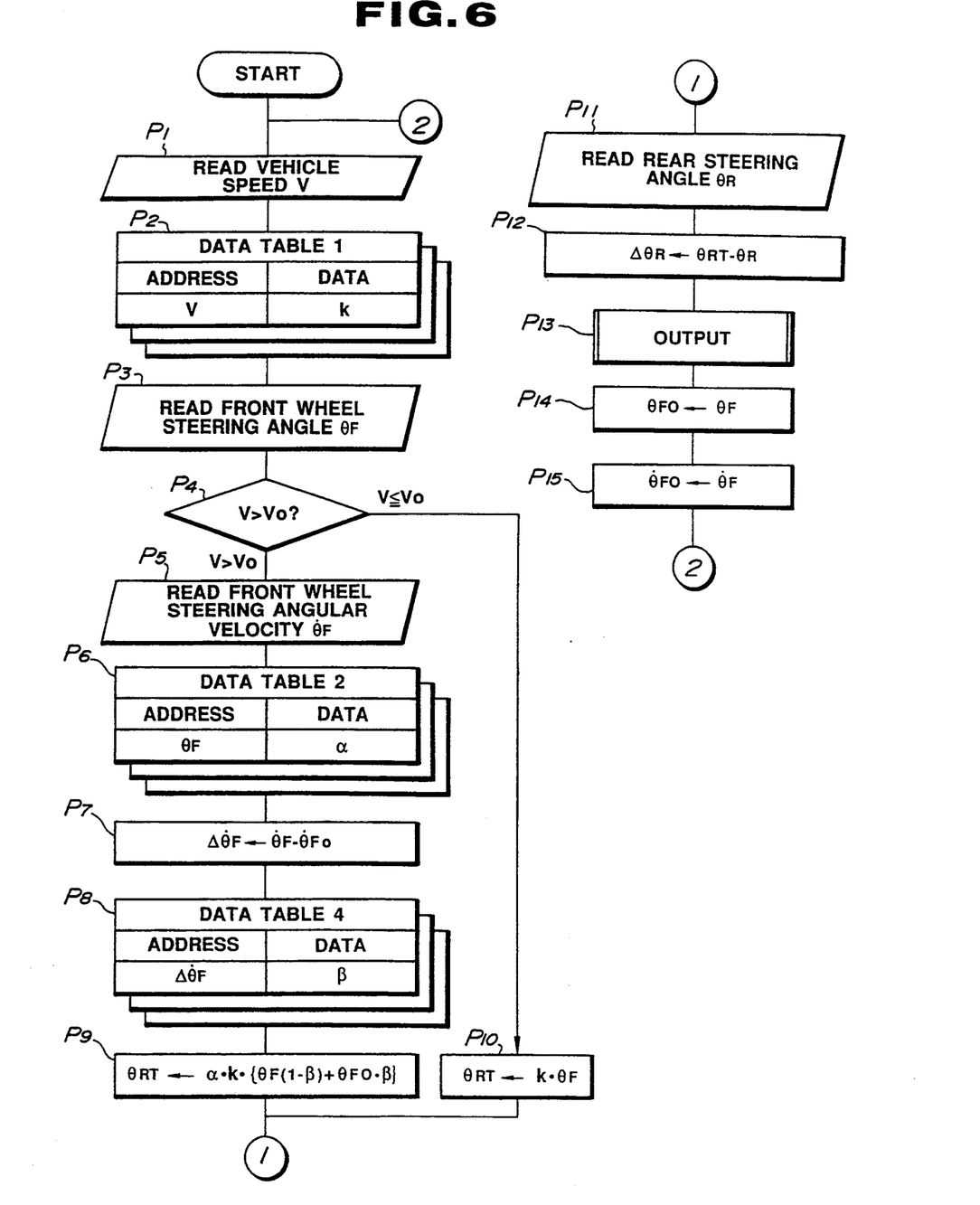
FIG. 6 is a flowchart of a control process according to a second embodiment of the present invention, which is to be executed by the controller in the four wheel steering system.
Figure 7:
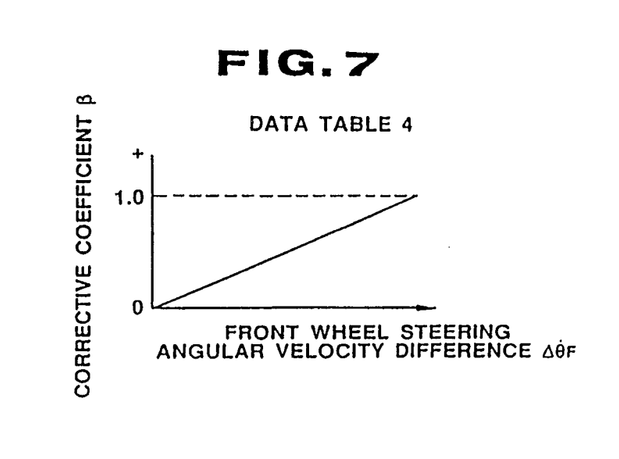
FIG. 7 a data table 4 of front wheel steering angular velocity differences $\Delta\dot{\theta}_F$ and corrective coefficients $\beta$, used in the control process shown in FIG. 6.

FIG. 6 shows a control process according to a second embodiment of the present invention, and FIG. 7 shows a data table used in the control process shown in FIG. 6. The control process shown in FIG. 6 can be executed by the controller 20 and used in combination with the motor vehicle shown in FIG. 1. The control process shown in FIG. 6 contains steps $P_1$ through $P_4$ and $P_{10}$ through $P_{14}$ that are identical to the steps $P_1$ through $P_4$ and $P_9$ through $P_{13}$, and hence these steps will not be described below.

In a step $P_5$, the microcomputer reads a front wheel steering angular velocity $\dot{\theta}_F$ from the output signal of the steering speed sensor 15. Then, the microcomputer searches the data table 2 shown in FIG. 4 for a corrective coefficient $a$ addressed by the front wheel steering angle $\theta_F$ in a step $P_6$. In a next step $P_7$, the microcomputer subtracts a previous front wheel steering angular velocity $\dot{\theta}_{F0}$ read in a previous routine from the front wheel steering angular velocity $\dot{\theta}_F$ read in the step $P_5$ of the present routine, thus producing a front wheel steering angular velocity difference $\Delta\dot{\theta}_F$. The front wheel steering angular velocity difference $\Delta\dot{\theta}_F$ may be regarded as being equivalent to a front wheel steering angular acceleration $\ddot{\theta}_F$ since the control process is carried out at predetermined cyclic periods. Then, in a step $P_8$, the microcomputer determines a corrective coefficient $\beta$ addressed by the front wheel steering angular velocity difference $\Delta\dot{\theta}_F$ from a data table 4 shown in FIG. 7. In FIG. 7, the corrective coefficient $\beta$ is a linear function of the front wheel steering angular velocity difference $\Delta\dot{\theta}_F$ and is linearly proportional thereto with a positive proportional constant.

In a next step $P_9$, the microcomputer calculates a target rear wheel steering angle $\theta_{RT}$ according to the following equation (3):

$$\theta_{RT} = k \times a \times \{(1-\beta)\theta_F + \beta \times \theta_{F0}\} \qquad (3)$$

When the steering acceleration is small, since $\beta \approx 0$, as can be seen from the equation (3) and FIG. 7, the equation (3) becomes:

$$\theta_{RT} = k \times a \times \theta_F \qquad (3)'$$

and hence the target rear wheel steering angle $\theta_{RT}$ is determined by the front wheel steering angle and the vehicle speed while the front and rear road wheels are being steered in the same phase.

When the steering acceleration is large, the corrective coefficient $\beta = 1$, and the equation (3) becomes:

$$\theta_{RT} = k \times a \times \theta_{F0} \qquad (3)''$$

Thus, it can be understood that when the steering action is effected with a high steering acceleration, the target rear wheel steering angle $\theta_{RT}$ is reduced while the front and rear road wheels are being steered in the same phase.

In the second embodiment, a higher yaw response is attained when the steering wheel is additionally turned quickly while the motor vehicle is making a turn. When the steering action is finished, the target rear wheel steering angle $\theta_{RT}$ quickly returns to the angle that is given according to the front wheel steering angle, making the motor vehicle highly stable.

The corrective processes using the steering angular velocity and the steering acceleration may be carried out simultaneously.

While the steering operation of the rear road wheels is controlled based on the front wheel steering angle $\theta_F$, the front wheel steering angular velocity $\dot{\theta}_F$, and the front wheel steering angular acceleration $\ddot{\theta}_F$ in the above embodiments, since the front wheel steering angle $\theta_F$ may be regarded as the angle through which the steering wheel 11 is turned, the steering operation of the rear road wheels may be controlled based on the angle through which the steering wheel 11 is turned, and other variables related to the steering wheel 11.

Since the change in the rear wheel steering angle is reduced when the steering action is effected at high steering speed, the four wheel steering system according to the present invention keeps the motor vehicle stable while increasing the yaw response thereof.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A four wheel steering system for a motor vehicle with steerable front and rear road wheels, comprising:
   means for detecting a front wheel steering angle $\theta_F$ through which the front road wheels are steered;
   means for detecting a vehicle speed V of the motor vehicle;
   means for determining a change in the front wheel steering angle;
   means for steering the rear road wheels; and
   control means for controlling said rear road wheels steering means based on the detected front wheel steering angle and the detected vehicle speed when the front road wheels are steered, said control means comprising means for controlling said steering means to steer the rear road wheels in a direction which is opposite to the front road wheels if the detected vehicle speed is smaller than a predetermined vehicle speed, controlling said steering means to steer the rear road wheels in a direction which is the same as the front road wheels if the detected vehicle speed is larger than the predetermined vehicle speed, controlling said steering means to increase a rear wheel steering angle through which the rear road wheels are steered as the front wheel steering angle increases if a change in the front wheel steering angle is smaller than a predetermined change in the front wheel steering angle, and controlling said steering means to reduce an increase in the rear wheel steering angle if a change in the front wheel steering angle is larger than said predetermined change in the front wheel steering angle.

2. A four wheel steering system according to claim 1, wherein said control means comprises a microcomputer for repeatedly executing a control process at cyclic periods, and controlling said steering means to steer the rear road wheels to a target rear wheel steering angle $\theta_{RT}$, said control process including an arithmetic operation to determine said target rear wheel steering angle $\theta_{RT}$ as defined by the following equation:

$$\theta_{RT} = k \times \alpha \times (\theta_{F0} + \theta_f)$$

where k is a ratio of the front wheel steering angle to the rear wheel steering angle, the ratio k being of a positive value when the vehicle speed V is higher than a predetermined vehicle speed $V_0(V > V_0)$ and at which the rear road wheels are steered in the same direction as the front road wheels, $\alpha$ is a corrective coefficient which is constant when the front wheel steering angle $\theta_F$ is smaller than a predetermined angle b and is progressively smaller when the front wheel steering angle $\theta_F$ is larger than said predetermined angle b, $\theta_{F0}$ is a front wheel steering angle detected in a previous routine of the control process, and $\theta_f$ is a corrective steering angle change corresponding to a front wheel steering angle difference $\Delta\theta_F$ between the front wheel steering angle $\Delta_{F0}$ detected in the previous routine and the front wheel steering angle $\theta_F$ detected in a present routine of the control process.

3. A four wheel steering system according to claim 2, wherein said corrective steering angle change $\theta_f$ is represented by a characteristic curve which is of a linearly varying positive value when said front wheel steering angle difference $\Delta\theta_F$ is smaller than a predetermined value c, and which is of an upwardly convex, parabolic positive value when said front wheel steering angle difference $\Delta\theta_F$ is larger than said predetermined value c.

4. A four wheel steering system according to claim 3, wherein said control means comprises means for controlling said steering means to steer the rear road wheels, based on only the vehicle speed and the front wheel steering angle, to a target rear wheel steering angle $\theta_{RT}$ as defined by the following equation:

$$\theta_{RT} = k \times \alpha \times \theta_F$$

when said front wheel steering angle difference $\Delta\theta_F$ is smaller than said predetermined value c with $\theta_f \approx \theta_F - \theta_{F0}$.

5. A four wheel steering system according to claim 3, wherein said control means comprises means for controlling said steering means to steer the rear road wheels to a target rear wheel steering angle $\theta_{RT}$ as defined by the following equation:

$$\theta_{RT} = k \times \alpha \times \theta_{F0}$$

when said front wheel steering angle difference $\Delta\theta_F$ is larger than said predetermined value c with $\theta_f = 0$, whereby a change in the rear wheel steering angle is reduced when the front wheels are additionally steered from a condition in which the front and rear road wheels are already being steered in the same direction.

6. A four wheel steering system according to claim 2, wherein said ratio k is zero when said vehicle speed V is equal to said predetermined vehicle speed $V_0$, and is of a negative value when the vehicle speed V is lower than said predetermined vehicle speed $V_0(V<V_0)$ and at which the rear road wheels are steered in the opposite direction to the front road wheels, and wherein said control process further includes an arithmetic operation to determine said target rear wheel steering angle $\theta_{RT}$ as defined by the following second equation:

$$\theta_{RT}=k\times\theta_F,$$

said control means comprising means for controlling said steering means to steer the rear road wheels to the target rear wheel steering angle $\theta_{RT}$ according to said second equation when the detected vehicle speed V is at most said predetermined vehicle speed $V_0(V\leq V_0)$.

7. A four wheel steering system according to claim 1, further including means for detecting a front wheel steering angular velocity $\dot\theta_F$ at which the front road wheels are steered, and wherein said control means comprises a microcomputer for repeatedly executing a control process at cyclic periods, and controlling said steering means to steer the rear road wheels to a target rear wheel steering angle $\theta_{RT}$, said control process including an arithmetic operation to determine said target rear wheel steering angle $\theta_{RT}$ as defined by the following equation:

$$\theta_{RT}=k\times a\times\{(1-\beta)\theta_F+\beta\times\theta_{F0}\}$$

where k is a ratio of the front wheel steering angle to the rear wheel steering angle, the ratio k being of a positive value when the vehicle speed V is higher than a predetermined vehicle speed $V_0(V>V_0)$ and at which the rear road wheels are steered in the same direction as the front road wheels, a is a corrective coefficient which is constant when the front wheel steering angle $\theta_F$ is smaller than a predetermined angle b and is progressively smaller when the front wheel steering angle $\theta_F$ is larger than said predetermined angle b, $\theta_{F0}$ is a front wheel steering angle detected in a previous routine of the control process, and $\beta$ is a corrective coefficient corresponding to a front wheel steering angular velocity difference $\Delta\dot\theta_F$ between the front wheel steering angular velocity $\dot\theta_{F0}$ detected in the previous routine and the front wheel steering angular velocity $\dot\theta_F$ detected in a present routine of the control process.

8. A four wheel steering system according to claim 7, wherein said corrective coefficient $\beta$ is represented by a linear function which is linearly proportional to said front wheel steering angular velocity difference $\Delta\dot\theta_F$ with a positive proportional constant.

9. A four wheel steering system according to claim 8, wherein said control means comprises means for controlling said steering means to steer the rear road wheels, based on only the vehicle speed and the front wheel steering angle, to a target rear wheel steering angle $\theta_{RT}$ as defined by the following equation:

$$\theta_{RT}=k\times a\times\theta_F$$

when said front wheel steering angular velocity difference $\Delta\dot\theta_F$ is relatively small with $\beta\approx 0$.

10. A four wheel steering system according to claim 7, wherein said control means comprises means for controlling said steering means to steer the rear road wheels to a target rear wheel steering angle $\theta_{RT}$ as defined by the following equation:

$$\theta_{RT}=k\times a\times\theta_{F0}$$

when said front wheel steering angular velocity difference $\Delta\dot\theta_F$ is relatively large with $\beta\approx 1$, whereby a change in the rear wheel steering angle is reduced when the front wheels are additionally steered from a condition in which the front and rear road wheels are already being steered in the same direction.

11. A four wheel steering system according to claim 7, wherein said ratio k is zero when said vehicle speed V is equal to said predetermined vehicle speed $V_O$, and is of a negative value when the vehicle speed V is lower than said predetermined vehicle speed $V_0(V<V_O)$ and at which the rear road wheels are steered in the opposite direction to the front road wheels, and wherein said control process further includes an arithmetic operation to determine said target rear wheel steering angle $\theta_{RT}$ as defined by the following second equation:

$$\theta_{RT}=k\times\theta_F,$$

said control means comprising means for controlling said steering means to steer the rear road wheels to the target rear wheel steering angle $\theta_{RT}$ according to said second equation when the detected vehicle speed V is at most said predetermined vehicle speed $V_0(V<V_0)$.

12. A four wheel steering system for a motor vehicle with steerable front and rear road wheels, comprising:
  means for detecting a front wheel steering angle $\theta_F$ through which the front road wheels are steered, said steering angle detecting means detecting the front wheel steering angle at predetermined cyclical intervals;
  means for detecting a vehicle speed V of the motor vehicle;
  means for determining a change in the front wheel steering angle as a difference between a most recently detected front wheel steering angle and a next most recently detected front wheel steering angle;
  means for steering the rear wheels; and
  control means for controlling said steering means based on the detected front wheel steering angle and the detected vehicle speed when the front road wheels are steered, said control means comprising means for controlling said steering means to steer the rear road wheels in a direction which is opposite to the front road wheels if the detected vehicle speed is smaller than a predetermined vehicle speed, controlling said steering means to steer the rear road wheels in a direction which is the same as the front road wheels if the detected vehicle speed is larger than the predetermined vehicle speed, controlling said steering means to increase a rear wheel steering angle through which the rear road wheels are steered in proportion to a determined increase in the detected change in the front wheel steering angle if the detected change is smaller than a predetermined change, and controlling said steering means to increase the rear wheel steering angle through which the rear road wheels are steered to a reduced extent not in proportion to the detected change in the front wheel steering angle if the detected change is larger than said predetermined change.

13. A four wheel steering system for a motor vehicle with steerable front and rear road wheels, comprising:
- means for detecting a front wheel steering angle $\theta_F$ through which the front road wheels are steered;
- means for detecting a front wheel steering angular velocity $\dot\theta_F$ at which the front road wheels are steered, said steering angular velocity detecting means detecting said steering angular velocity at predetermined cyclic intervals;
- means for detecting a vehicle speed V of the motor vehicle;
- means for determining a change in a front wheel steering angular velocity based on a difference between a most recently detected front wheel steering angular velocity and a next most recently detected front wheel steering angular velocity;
- means for steering the rear wheels; and
- control means for controlling said steering means based on the detected front wheel steering angle, the detected steering angular velocity and the detected vehicle speed when the front road wheels are steered, said control means comprising means for controlling said steering means to steer the rear road wheels in a direction which is opposite to the front road wheels if the detected vehicle speed is smaller than a predetermined vehicle speed, controlling said steering means to steer the rear wheels in a direction which is the same as the front road wheels if the detected vehicle speed is larger than the predetermined vehicle speed, controlling said steering means to increase a rear wheel steering angle through which the rear road wheels are steered in proportion to a determined increase in the front wheel steering angular velocity if the detected change is smaller than a predetermined change, and controlling said steering means to increase the rear wheel steering angle through which the rear road wheels are steered to a reduced extent not in proportion to the detected change in the front wheel steering angular velocity if the detected change is larger than said predetermined change.

* * * * *

UNITED STATES PATENT AND TRADEMARK OFFICE
CERTIFICATE OF CORRECTION

PATENT NO. : 5,365,440                    Page 1 of 2
DATED     : November 15, 1994
INVENTOR(S) : Abe et al.

It is certified that error appears in the above-indentified patent and that said Letters Patent is hereby corrected as shown below:

In the Abstract, line 11, change "steering" to --steered--.

Column 2, line 24, change "$\Delta\theta_F$" to --$\Delta\dot{\theta}_F$--.

Column 4, line 68, change "$\theta_{RT} = k \times \alpha \times (\theta_{fO} + \theta_f)$ to --$\theta_{RT} = k \times \alpha \times (\theta_{FO} + \theta_f)$--.

Column 6, line 28, change "$\theta_F$" to --$\dot{\theta}_F$--;
Column 6, line 34, change "$\theta_{FO}$" to --$\dot{\theta}_{FO}$--;
Column 6, line 35, change "$\theta_F$" to --$\dot{\theta}_F$--;
Column 6, line 37, change "$\Delta\theta_F$" to --$\Delta\dot{\theta}_F$--;
Column 6, line 38, change "$\Delta\theta_F$" to --$\Delta\dot{\theta}_F$--;
Column 6, line 40, change "$\theta_F$" to --$\ddot{\theta}_F$--;
Column 6, line 44, change "$\Delta\theta_F$" to --$\Delta\dot{\theta}_F$--;
Column 6, line 47, change "$\Delta\theta_F$" to --$\Delta\dot{\theta}_F$--;
Column 6, line 53, change "$\theta_{RT} = k \times \alpha \times \} (1-\beta)\theta_F + \beta \times \theta_{FO} \equiv$" to
    --$\theta_{RT} = k \times \alpha \times \{ (1-\beta)\theta_F + \beta \times \theta_{FO} \}$--.

Column 7, line 19, change "$\theta_F$," to --$\dot{\theta}_F$,--;
Column 7, line 20, change "$\theta_F$" to --$\ddot{\theta}_F$--.

Column 8, line 15 (claim 2, line 10), change "$\theta_{RT} = k \times \alpha \times (\theta_{FO} + O_f)$" to
    --$\theta_{RT} = k \times \alpha \times (\theta_{FO} + \theta_f)$--;
Column 8, line 31 (claim 2, line 26), change "$\Delta_{FO}$" to --$\theta_{FO}$--;
Column 8, line 64 (claim 5, line 10), change "$\theta_f = 0$," to --$\theta_f \approx 0$,--.

UNITED STATES PATENT AND TRADEMARK OFFICE
CERTIFICATE OF CORRECTION

PATENT NO. : 5,365,440
DATED : November 15, 1994
INVENTOR(S) : Abe et al.

It is certified that error appears in the above-indentified patent and that said Letters Patent is hereby corrected as shown below:

Column 9, line 21 (claim 7, line 3), change "$\theta_F$" to --$\dot{\theta}_F$--;
Column 9, line 30 (claim 7, line 13), change "$\theta_{RT} = k \times \alpha \times \} (1-\beta)\theta_F + \beta \times \theta_{FO}\}$" to --$\theta_{RT} = k \times \alpha \times \{ (1-\beta)\theta_F + \beta \times \theta_{FO}\}$--;
Column 9, line 46 (claim 7, line 28), change "$\Delta\theta_F$" to --$\Delta\dot{\theta}_F$--;
Column 9, line 47 (claim 7, line 29), change "$\theta_{FO}$" to --$\dot{\theta}_{FO}$--;
Column 9, line 48 (claim 7, line 30), change "$\theta_F$" to --$\dot{\theta}_F$--;
Column 9, line 53 (claim 8, line 4), change "$\Delta\theta_F$" to --$\Delta\dot{\theta}_F$--;
Column 9, line 65 (claim 9, line 11), change "$\Delta\theta_F$" to --$\Delta\dot{\theta}_F$--.

Column 10, line 29 (claim 11, line 18), change "$V_O (V < V_O)$." to --$V_O (V \leq V_O)$.--.

Column 11, line 6 (claim 13, line 6), change "$\theta_F$" to --$\dot{\theta}_F$--.

Signed and Sealed this

Fourth Day of April, 1995

Attest:

BRUCE LEHMAN

*Attesting Officer*   Commissioner of Patents and Trademarks